United States Patent [19]
Hahlbeck

[11] 3,742,568
[45] July 3, 1973

[54] APPARATUS FOR POSITIONING A GEAR
[75] Inventor: Edwin C. Hahlbeck, Greendale, Wis.
[73] Assignee: Milwaukee Gear Company, Milwaukee, Wis.
[22] Filed: May 25, 1971
[21] Appl. No.: 146,715

[52] U.S. Cl............................................. 29/200 P
[51] Int. Cl.......................................... B23p 19/00
[58] Field of Search..................... 29/200 R, 200 P, 29/200 J, 200 A

[56] References Cited
UNITED STATES PATENTS
3,460,226 8/1969 Hildebrand........................ 29/200 P
3,619,883 11/1971 Venables............................ 29/200 J

*Primary Examiner*—Thomas H. Eager
*Attorney*—Thomas O. Kloehn and Barry E. Sammons

[57] ABSTRACT

A portable apparatus for locating gear rack segments for mounting in a traction system for a shipboard gantry crane which rides on the T-rail for the gantry crane. The apparatus has a roller which bears against a datum rail parallel to the T-rail for laterally locating a drive pinion on the gantry crane. A clamping jaw and pitch block assembly on the apparatus holds a rack segment so that its mesh with the drive pinion defines a predetermined operating pitch plane while the rack segment is welded to a supporting structure.

9 Claims, 14 Drawing Figures

INVENTOR
EDWIN C. HAHLBECK

BY Thomas O. Kloehn

ATTORNEY

INVENTOR
EDWIN C. HAHLBECK

APPARATUS FOR POSITIONING A GEAR

BACKGROUND OF THE INVENTION

The patent of William A. Barr, U.S. Pat. No. 3,636,791, for a "Gear Rack or Rack Construction" dated Jan. 25, 1972 discloses a gear rack to be mounted along the length of an ocean-going cargo vessel to be used as part of a traction system for a gantry crane that travels the length of the vessel to load and unload cargo containers. The gear rack is approximately 600 feet long and is made up of approximately 200 three foot long rack segments mounted end to end. The lack of a close tolerance reference on the rack segments, and the lack on the vessel of a mounting surface located within sufficiently close tolerances necessitated the creation of some hitherto unknown means for accurately positioning and stabilizing the rack segments for mounting.

Conventionally, gear members are manufactured with a precisely located surface or center distance or other manufactured reference for mounting. Such a gear member then need only be properly secured to its mounting. For the present application no such reference surfaces exist. Hence the idea was conceived of mounting the rack members with reference only to the imaginary operating pitch plane as is disclosed in the copending application of Barr, Hahlbeck and Heine for "Gear Structure and Method of Making the Same" filed on Apr. 5, 1971, Ser. No. 131,241. However, no means were known for locating the rack segments with respect to their operating pitch planes, or for fixing the rack segments in such a precise location while the rack segments are permanently secured in position. The present invention provides a solution to that problem.

SUMMARY OF THE INVENTION

The present invention relates to an apparatus for positioning a gear element relative to its operating pitch surface, and more particularly the invention resides in the combination of a chassis which has a vertical supporting means and a fixed lateral guide with means for holding said lateral guide against a predetermined reference surface and a level indicator to detect and indicate the attitude of said chassis, and which supports a gear supporting means mounted on said chassis and having means for holding a gear element in meshing relationship with it in a fixed predetermined position relative to said chassis so as to precisely locate the operating pitch surface.

The apparatus as set forth above is capable of locating in space the operating pitch plane of the gear to be mounted so that the gear may be positioned with reference only to its operating pitch surface. Moreover this apparatus is capable of holding the gear in that position while it is being mounted. The apparatus according to the present invention requires only two external reference points in order to locate the gear member within close tolerances and it is capable of many modifications rendering it highly versatile. Finally, this apparatus may be made highly portable so that it can be transported to the place where the gear is to be used and does not require the facilities or environment of a factory for its intended operation.

DETAILED DESCRIPTION OF THE PREFERRED EMBODIMENT

As used herein the word "gear" refers to any machine part that has gear teeth, including but not limited to racks, as well as various forms of rotating gears. "Pitch surfaces" are imaginary planes, cylinders or cones that roll together, without slipping. An "operating pitch surface" is a specific pitch surface defined by two meshing gears in actual operation, and an operating pitch surface may be located entirely differently with respect to a gear from the standard, hypothetical pitch surface for which the gear was designed. A disparity between the location of the operating pitch surface and the standard pitch surface may cause the gear to fail to perform as specified. The "body" of a gear is that portion of the gear which supports the teeth. A more complete lexicography of gear terminology is set for the copending application of Barr, Hahlbeck and Heine for a "Gear Structure and Method of Making the Same" filed on Apr. 5, 1971, Ser. No. 131,241.

Figure 1:
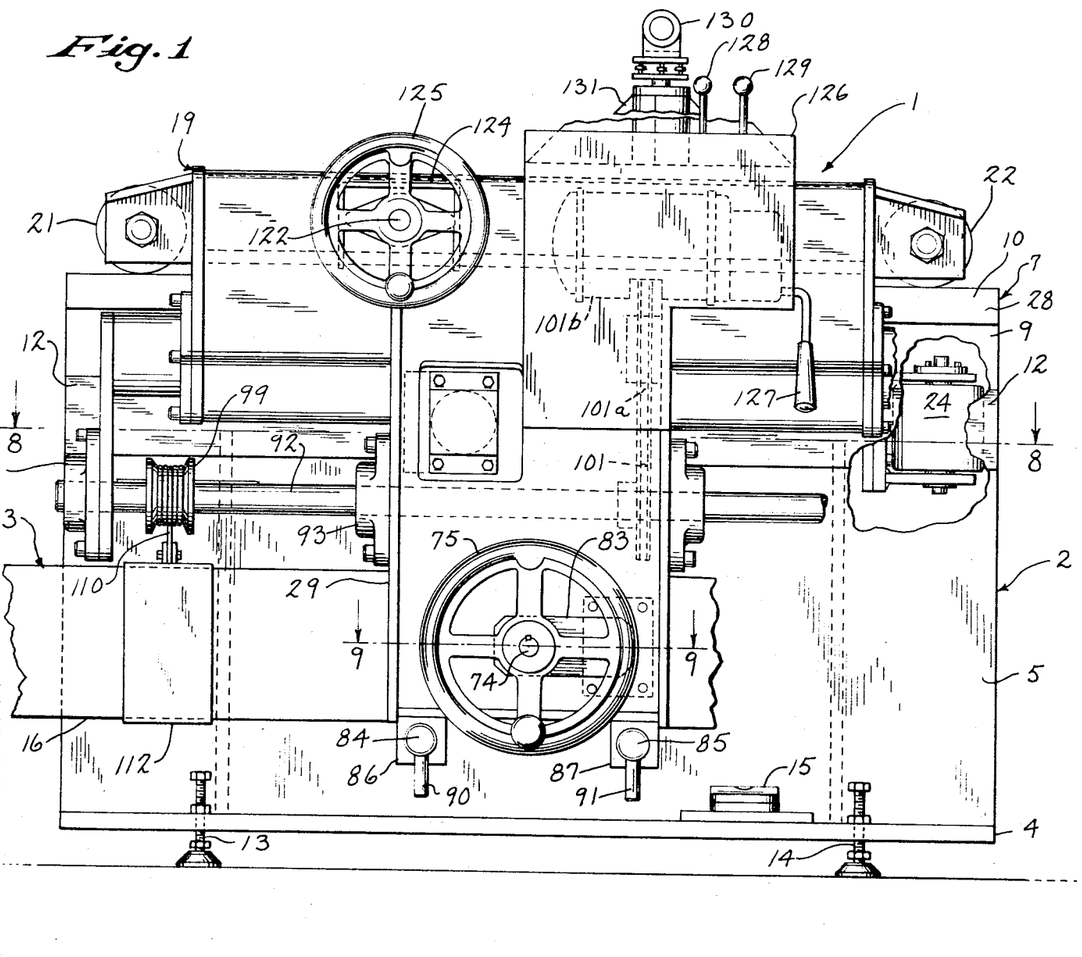
FIG. 1 is a side elevation of a gear positioning apparatus embodying the present invention mounted on a calibration stand.

A preferred embodiment of the gear positioner 1 according to the present invention is illustrated in FIG. 1 mounted on a calibration stand 2, which is a model of the environment in which this embodiment of the invention is to be used. The gear positioner 1 of this embodiment is designed for use in mounting a rack 3 on an ocean-going vessel to be used as part of a traction system for driving a gantry crane which traverses the length of the ship and straddles the cargo hatches to load and unload cargo from the hold.

Hence, the calibration stand 2 has a flat baseplate 4 which mimics the deck of a ship and from the center of which a heavy steel plate 5 rises vertically. A horizontal bed plate 6 is supported on top of the vertical steel plate 5 to mount a T-rail 7 on which the gantry crane rides. The T-rail 7 has a flat base 8 resting on the bed plate 6 with a slender vertical web 9 which in turn supports a head 10 on which the wheels of a gantry crane (not shown) roll. The head 10 of the rail 7 represents the vertical reference and support for the gear positioner 1 of the present invention.

The horizontal bed plate 6 also has affixed to one lateral edge a vertical datum rail 11 and to its opposite lateral edge a vertical pressure rail 12. The datum rail 11 and pressure rail 12 are vertically oriented steel strips welded along the lateral edges of the bed plate 6 on both the calibration stand 2 and a track supporting structure on the ship which is mimicked by the calibration stand 2 The datum rail 11 serves as the second reference, in this instance a horizontal reference for both the gear positioner 1 and for the traction system of the crane (not shown). The pressure rail 12 serves as a counter support, against which a force may be urged, to hold a follower in tight engagement with the datum rail 11, just as gravity will hold the wheels of the crane and the gear positioner 1 against the head 10 of the T-rail 7. For purposes of accurately orienting the calibration stand 2, screw adjustable feet 13 and 14 are mounted through the baseplate 4 of the calibration stand 2, and a test gauge level 15 is mounted on the top of the foot portion 4 so as to be rotatable through 360°. A rack segment 16 is also mounted on the vertical steel plate 5 by means of steel clips 17 and 18, which are welded to the vertical plate 5 and to the top and bottom sides of the rack 16, respectively.

Figure 2:
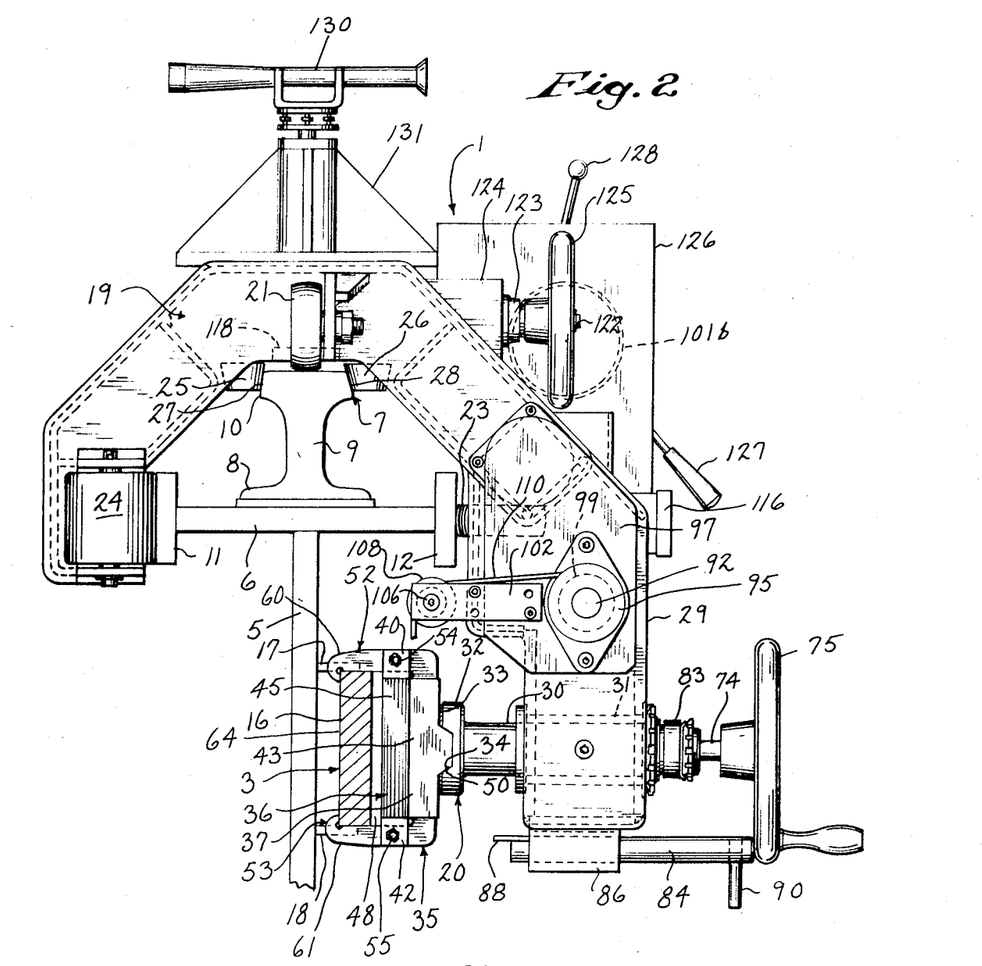
FIG. 2 is an end elevation of the gear positioning apparatus shown in FIG. 1.

The gear positioner 1 is made up, generally, of a chassis 19 and a rack fixture 20, which is supported by the chassis 19, all of which is constructed of steel or other metal, and coated or formulated to resist the effects of the corrosive sea salt atmosphere. Viewed from the end as in FIG. 2, the chassis 19 has a generally inverted V-shape with a top wheel 21 and 22 adjacent each end mounted at its apex to ride upon the head 10 of the T-rail 7 and to provide vertical support for a chassis 19. A pressure roller 23 is movably mounted on the rack fixture side of the chasis 19 to bear against the pressure rail 12, and a fixed, reference roller 24 is mounted on the other side of the chassis 19 to engage the datum rail 11 on the bed plate 6. The reference roller 24 is held in an engagement with the datum rail 11 by means of the pressure roller 23 which is continuously urged against the pressure rail 12 when the positioner 1 is in use. A pair of frusto-conical rollers 25 and 26 are mounted on vertical axes in spaced apart relationship to straddle the head 10 of the T-rail 7 and bear against flanks 27 and 28 of the head 10. The mountings of the pair of rollers 25 and 26 are laterally adjustable so that by the adjustment, the attitude of the gear positioner 1 in a transverse plane as shown in FIG. 2 can be tilted. The bearings of all of the rollers 23, 24, 25 and 26 are mounted in rotatably adjustable eccentric mountings so that the positions of the rollers 23–26 can be adjusted.

Figure 3:
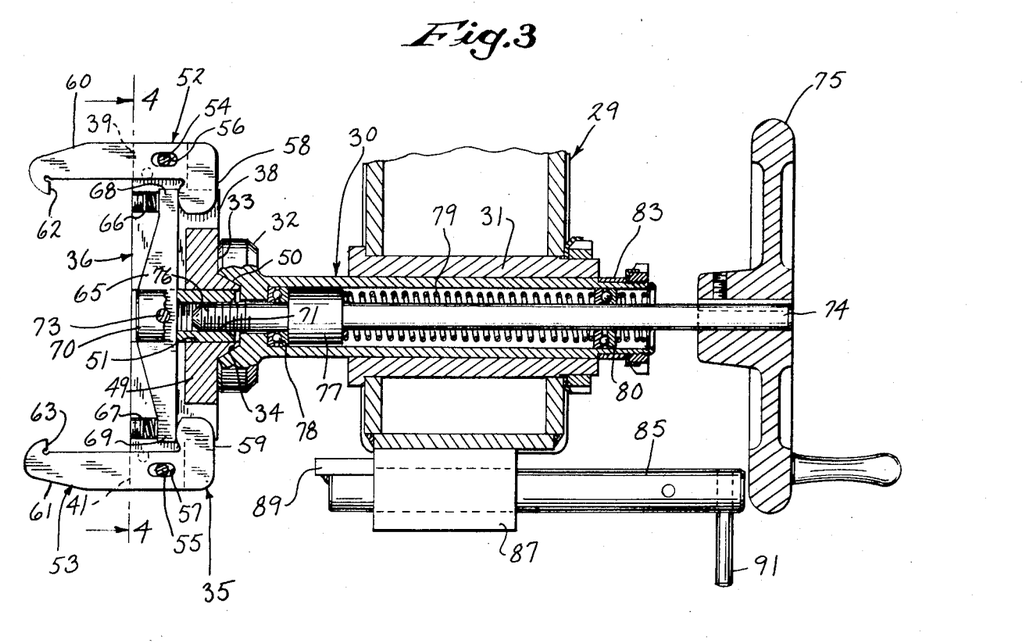
FIG. 3 is an end elevation, partially in section, of the gear fixture portion of the apparatus shown in FIGS. 1 and 2.

The rack fixture 20 is mounted in a steel frame 29, which is an extension of the chassis 19 projecting downwardly from the center of the chassis 19 on the rack side of the vertical steel plate 9. The fixture 20 includes a spindle 30 which is mounted for axially reciprocating movement on a horizontal bushing 31 through the frame 29. The spindle 30 is a hollow, round cylindrical structure with an enlarged head 32 on its inside end, and the head 32 has a flat vertical face 33 with a recessed, horizontal groove 34 extending across it to receive a pitch block and jaw assembly 35 for gripping and locating the rack segment 16.

Figure 4:
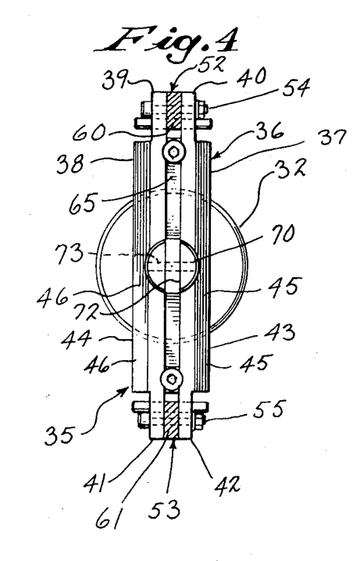
FIG. 4 is an elevation of the pitch block and jaw assembly, used in the gear fixture taken along the line 4—4 in FIG. 3.
Figure 5:
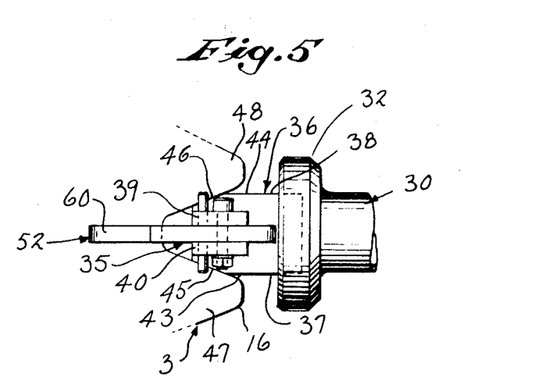
FIG. 5 is a top plan view of the pitch block and jaw assembly shown in FIG. 4 in mesh with the gear to be altered.

The pitch block and jaw assembly 35 is made up in part of a pitch block 36 that is dimensioned and shaped to mimic the teeth of a drive pinion (not shown) designed to mesh with the rack 3. The pitch block 36 has two flank plates 37 and 38 with reduced end extensions 39, 40, 41 and 42, respectively, and the flank plates 37 and 38 have parallel side surfaces 43 and 44, respectively, and tapered meshing surfaces 45 and 46 which are shaped to match and mesh with the rack teeth 47 and 48. A spacer rate 49 is mounted between the flank plates 37 and 38 in a longitudinally central location, and the spacer plate 49 is considerably shorter than the flank plates 37 and 38 and its width is approximately equal to the width of the parallel sides 43 and 44 of the flank plates 37 and 38. The assembled pitch block 36 has a centrally located raised land 50, and a hole 51 communicates from the outside of the land 50 through the pitch block 36 to the space between the flank plates 37 and 38 behind the spacer plate 49. A pair of bell crank jaws 52 and 53 are mounted, respectively, between the reduced extension 39 and 40, 41 and 42 of the flank plates 37 and 38 for limited pivotal and sliding movement about pins 54 and 55, respectively, which are mounted in the reduced extensions 39 and 40, 41 and 42, respectively and which pass through slots 56 and 57, respectively, through the bell crank jaws 52 and 53. The bell crank jaws 52 and 53 have force arms 58 and 59, which project centrally inwardly between the flank plates 37 and 38 of the pitch block 36, and work arms 60 and 61, which extend out between the flank plates 37 and 38 and have hooked ends 62 and 63 designed to fit behind a back surface 64 of the rack segment 16. An actuator bar 65 is slidably located between the flank plates 37 and 38 next to the spacer plate 49 and is spring biased toward the spacer plate 49 by a pair of imprisoned coil springs 66 and 67 located beneath its ends 68 and 69. The actuator bar 65 has its ends 68 and 69 inside of, and abutting, the work arms 60 and 61 of the bell crank jaws 52 and 53, respectively.

A cylindrical link 70 is loosely fitted in the hole 51 through the raised land 50 of the pitch block 36 so that it can slide axially in the hole 51. The external end of the link 70 has a hole 71 bored in it and the hole 71 is internally threaded. The internal end of the link 70 is bifurcated by a slot 72, which receives the center of the actuator bar 65, to which it is fastened by a pin 73 mounted through the link 70 and the center of the actuator bar 65.

Inside of the hollow spindle 30 a spindle shaft 74 is rotatably mounted through it with provision for axial resilience. A hand wheel 75 is mounted on the outer end of the spindle shaft 74, which projects from the outer end of the spindle 30, and the inner end 76 of the spindle shaft 74 is threaded to engage the internally threaded hole 71 in the link 70. The inner end 76 of the spindle shaft 74 projects from the center of the guide way 34 across the face 33 of the head 32 of the spindle 30. Internally of the spindle 30, the spindle shaft 74 has a collar 77 formed on it which is urged against an anti-friction bearing 78 mounted inside of the spindle 30 by a coil spring 79 which is wound about the spindle shaft 74 and which has its other end abutting against another antifriction bearing 80 that is mounted inside the spindle 30 next to its outer end. A pneumatic cylinder 81 is mounted in the rack fixture frame 29 adjacent to the bushing 31 that hold the spindle 30, and the pneumatic cylinder 81 has a piston rod 82 extending from it that is linked by a link bar 83 to the external end of the spindle 30 which projects from the bushing 31. Thus as the pneumatic cylinder 81 is actuated, extending and retracting its piston rod 82, it slides the spindle toward or away from the rack 3.

A pair of rack carrying arms 84 and 85, respectively, are slidably mounted through brackets 86 and 87 on the bottom of the fixture frame 29. Each of the rack carrying rods 84 and 85 has a disc platform 88 and 89, respectively, on its inner end at the level of the bottom of the rack 3 when the rack 3 is at its proper height to be engaged by the pitch block and jaw assembly 35. The outer ends of the rack carrying rods 84 and 85, respectively, have downwardly extending handles 90 and 91 by which they are grasped to be slid beneath or out from under the rack 3.

Figures 8, 9:
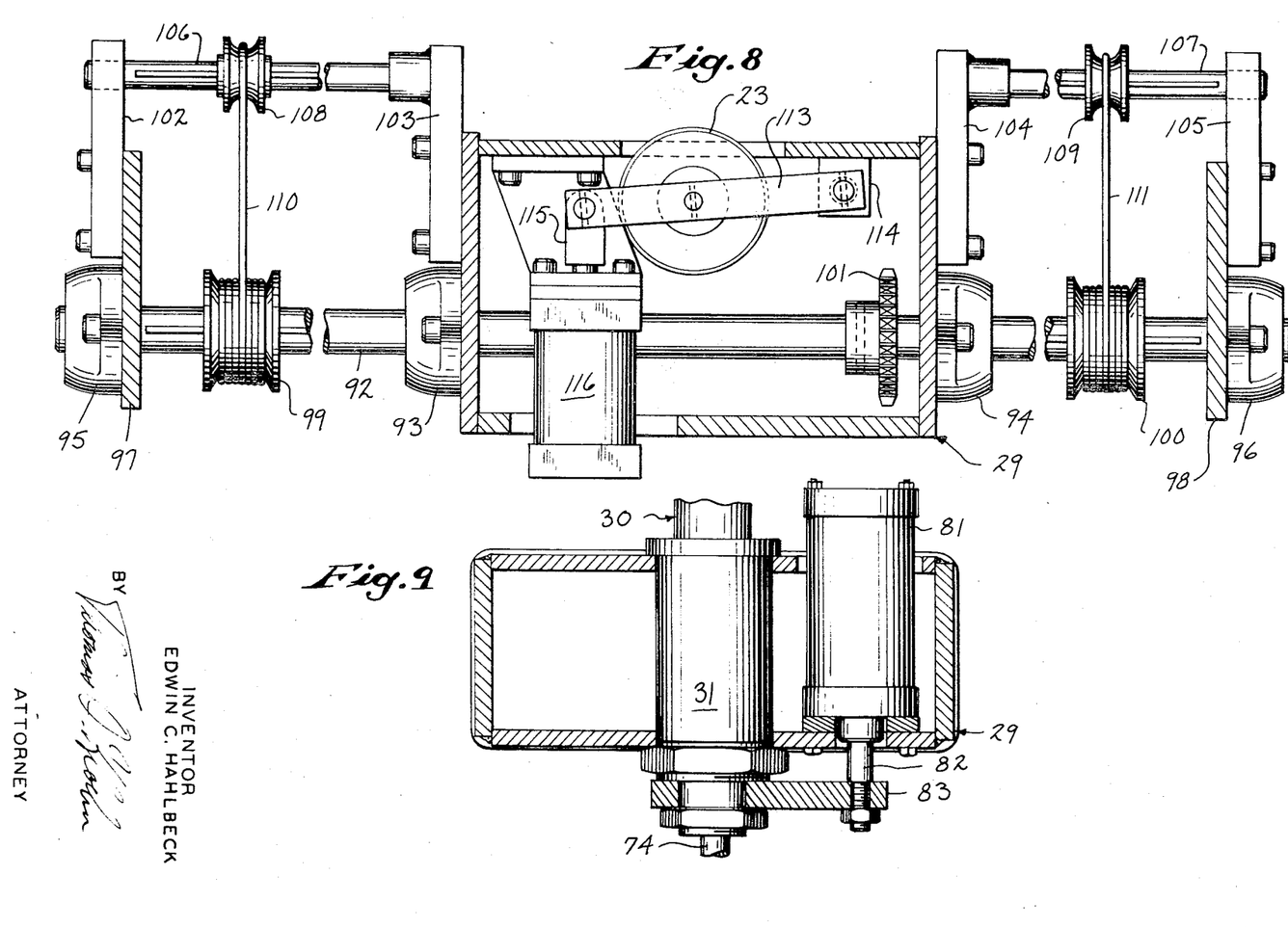
FIG. 8 is a top plan view in section of the apparatus showing the hoist and pressure roller structure, taken along the line 8—8 in FIG. 1.
FIG. 9 is a top plan view in section of a portion of the gear fixture taken along the line 9—9 in FIG. 1.
Figure 10:
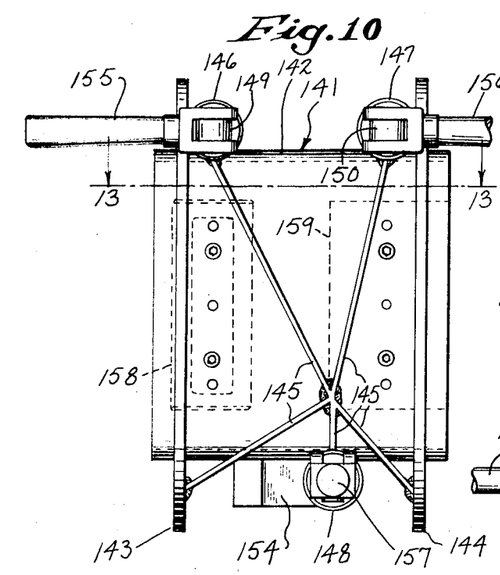
FIG. 10 is an elevation of a pitch alignment clamp.
Figure 11:
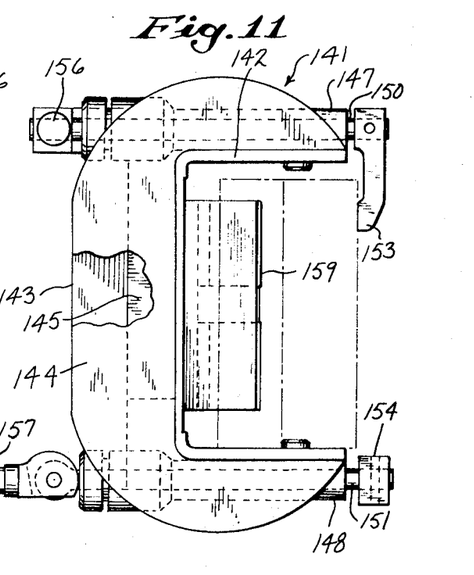
FIG. 11 is an end elevation of a pitch alignment clamp shown in FIG. 10.
Figures 12, 13:
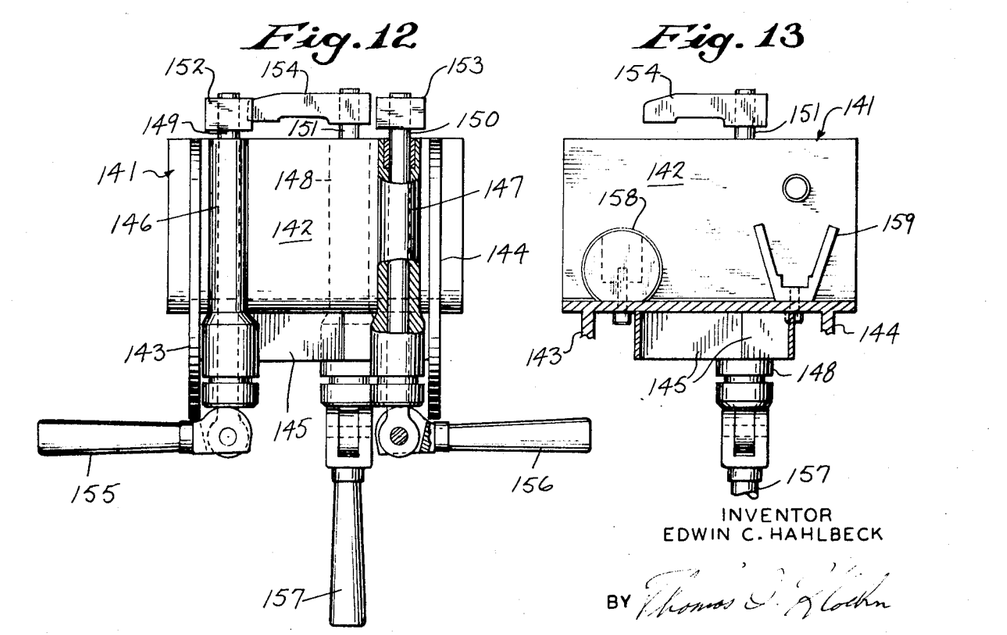
FIG. 12 is a top plan view of the pitch alignment clamp.
FIG. 13 is a top plan view in section of the pitch alignment clamp taken along the line 13—13 in FIG. 10.

The rack fixture frame 29 also includes a power hoist for the rack segments 16. The hoist is made up of a hoist shaft 92 which is rotatably mounted horizontally through bearings 93 and 94 near the top of the rack fixture frame 29. The ends of the hoist shaft 92 are supported in bearings 95 and 96, respectively, that are mounted in plates 97 and 98, respectively, which extend downward from the opposite ends of the chassis 19. Between the end bearings 95 and 96 and the central bearings 93 and 94, respectively, on each side of the fixture frame 29 cable drums 99 and 100, respectively, are mounted for axial adjustment on the hoist shaft 92. Inside of the fixture frame 29, a sprocket 101 is mounted on the shaft 92 from which a drive chain 101a extends to a pneumatic motor 101b for driving the hoist. Arms 102, 103, 104 and 105, respectively, extend inwardly from the bearing plates 97 and 98 and the sides of the frame 29 to support idler shafts 106 and 107, respectively, parallel with the main hoist shaft 92, and pulleys 108 and 109 are respectively mounted on the idler shafts 106 and 107 for axial adjustment thereon. The arms 102-105 locate the pulleys 108 and 109, respectively, above the desired position for the rack 3 and cables 110 and 111 extend from the cable drums 99 and 100 over the pulleys 108 and 109, respectively, to hooks 112 (one of which is shown), which are used alternately to engage the rack segment 16.

The proper location of the chassis 19, which in turn controls the proper location of the fixture frame 29, is attained and maintained by two devices. First, the pressure roller 23 is urged tightly against the pressure rail 12 so as to maintain the reference roller 24 in close engagement with the datum rail 11. The pressure roller 23 is mounted on a second class lever 113, one end of which is pivoted on a bracket 114 on the inside of the chassis 19 and the other end of which is connected to a piston rod 115 of a pneumatic cylinder 116 which is also mounted on the inside of the chassis 19. Thus, by energizing the pneumatic cylinder 116, the pressure roller 23 is driven against the pressure rail 12 to hold the reference roller 24 in tight engagement with the datum rail 11.

Figure 6:
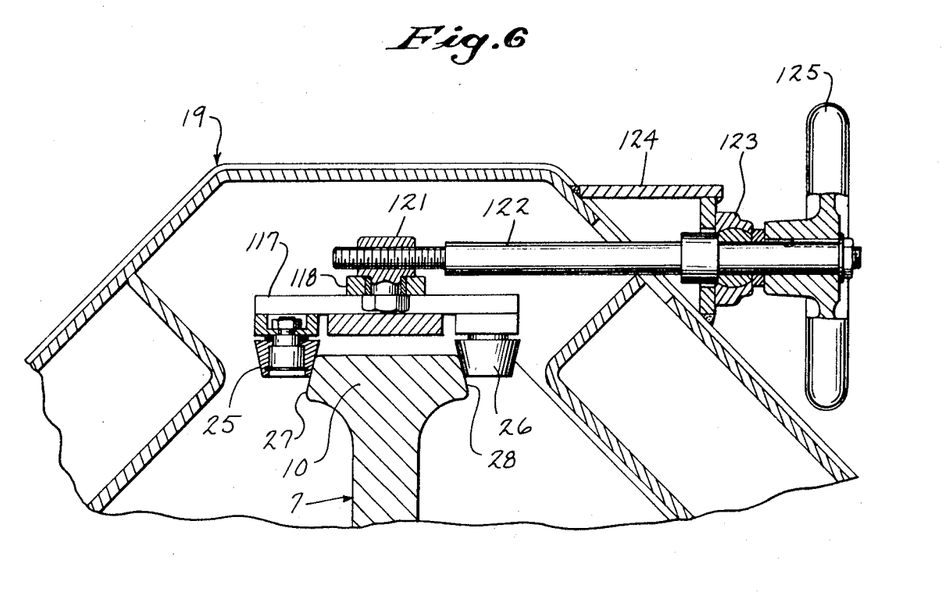
FIG. 6 is an end elevation in section of a portion of the chassis of the apparatus in FIGS. 1 and 2 showing the level adjustment.
Figure 7:
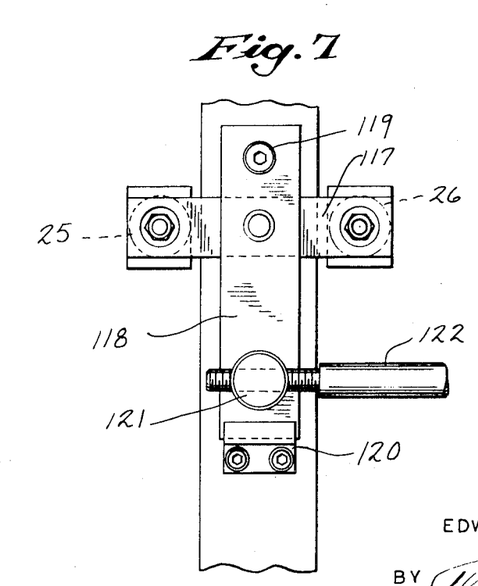
FIG. 7 is a top view of a portion of the level adjustment shown in FIG. 6.

The attitude of the chassis 19, as was mentioned above, may also be controlled by the adjustable pair of level shift rollers 25 and 26 which engage the flanks 27 and 28 of the head 10 of the T-rail 7. The level shift rollers 25 and 26 are mounted on opposite ends of a cross bar 117, the center of which is bolted to a second class adjusting lever 118. The adjusting lever 118 has one end pivoted on a bolt 119 anchored in the top of the chassis 19 and the other end is slidably retained beneath a guide strip 120 which is also mounted in the top of the chassis 19. A nut 121 with a horizontal, threaded hole through it is mounted on the end of the adjusting lever 118 adjacent to the guide strip 120 so as to project above the adjusting lever 118, and a threaded adjusting shaft 122 is threaded through the nut 121. The adjusting shaft 122 is rotatably mounted through a bearing 123 which in turn is mounted in a bracket 124 in the top of the chassis 19. The bearing 123 also holds the adjusting shaft 122 against axial movement so that as the adjusting shaft 122 is turned in the nut 121, the adjusting lever 118 will be moved. The outside end of the adjusting shaft 122 has a hand wheel 125 mounted on it.

A motor housing 126 projects from the chassis 19 to enclose the pneumatic hoist motor 101b as well as the pneumatic plumbing and valves (not shown) for the power operated devices mentioned above. A control handle 127 for the hoist motor 101b, which controls both the direction and velocity of the motor operation, extends from the side of the motor housing 126. Projecting from the top of the motor housing 126 is, on the left, a pressure wheel control handle 128 and, on the right a spindle control handle 129. The pressure wheel control handle 128 controls the air pressure to the pressure wheel pneumatic cylinder 116, and the spindle control handle 129 controls the air pressure to the pneumatic cylinder 81 that reciprocates the spindle 30 toward or away from the rack 3. For determining the attitude of the chassis 19, a simple spirit level might be used, but the preferred embodiment employs a more universal device, to-wit: a dumpy level 130 which is mounted atop a pedestal 131 on top of the chassis 19.

Figure 14:
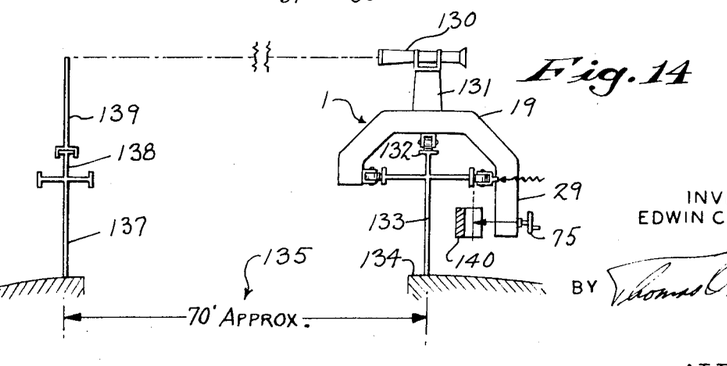
FIG. 14 is a diagrammatic elevation of the preferred embodiment of the invention in use on a ship.

FIG. 14 illustrates diagramatically the manner in which the dumpy level 130 is used to level the chassis 19. In FIG. 14 the gear positioner 1 is mounted on a track 132 which stands on a girder 133 on a deck 134 of a ship on one side of a cargo hold 135. On the deck 136 across the cargo hold 135 is another girder 137 supporting another track 138 on which a level rod 139 is standing. By sighting through the dumpy level 130 to the level rod 139, the gear positioner 1 may be adjusted to the proper attitude for mounting a rack 140, even though the ship may be listing.

The extended rack 3 for the ship is mounted utilizing the present invention by mounting several hundred rack segments 16, each being about 3 feet long, end to end to achieve a rack 3 of the desired length, and means are needed to insure an absolute uniformity of pitch between abutting rack segments 16. To achieve that end a unique alignment clamp 141 is provided. The alignment clamp is made of a channel member 142 with two C-shaped ribs 143 and 144 welded about its exterior to provide support, along with interconnecting supporting ribs 145. Two tubes 146 and 147 are welded to the outside of the channel member 142 adjacent each of the C-shaped ribs 143 and 144 along the top surface and one tube 148 is welded to the outside of the channel member 142 along its bottom surface between the two C-shaped ribs 143 and 144. In each of the tubes 146, 147 and 148 a clamping rod 149, 150 and 151, respectively, is loosely mounted and each of the clamping rods 149, 150 and 151 has a clamp jaw 152, 153 and 154, respectively, pinned to its front end so as to extend at right angles to its respective clamp rod 149, 150 and 151. A cam handle 155, 156 and 157 is pivotally mounted on the back end of each of the clamp rods 149, 150 and 151, respectively, to bear against enlarged ends 158, 159 and 160, respectively, of the tubes 146, 147 and 148. Hence, by rotating the clamping rods 149, 150 and 151 in the tubes 146, 147 and 148, respectively, and then pivoting the cam handles 155, 156 and 157 the clamping jaws 152, 153 and 154 can be brought to bear tightly against the back surface of a rack. Inside of the channel member 142, a round cylindrical pitch rod 158 is mounted vertically across the back surface, and precisely spaced from the pitch rod 158 across the back surface and parallel to it is a steel trough 159 with precisely dimensioned diverging sides. The pitch rod 158 has a diameter such as to engage the teeth of one rack member precisely at its pitch plane and the pitch trough is precisely located and dimensioned to grasp a tooth of another rack member so that when the clamping jaws 152, 153 and 154 are drawn tightly against the back surface of the rack members, they will drive the pitch rod 158 into tight mesh with the rack teeth and they will clamp the pitch trough 159 over other rack teeth to position abutting rack segments 16 in precise pitch alignment.

The first step in the utilization of the positioner 1 of the present invention is its calibration. The positioner 1 is hoisted with a crane onto the calibration stand 2 so that it rests upon its top wheels 21 and 22 on the T-rail 7, and its reference roller 24 is drawn up tightly against the guide rail 11 by pushing the pressure wheel control handle 128 inward so as to actuate the pressure wheel pneumatic cylinder 116. It is assumed that the pneumatic circuitry has been connected to a source of air pressure (not shown). The test stand 2 is leveled by adjusting the feet 13 and 14 until the test stand's spirit level 15 registers level in all quadrants. The level shift rollers 25 and 26 are rotatably mounted about adjustable eccentrics and these are now adjusted, if necessary, so that the level shift rollers 25 and 26 bear against the respective flanks 27 and 28 of the head 10 of the T-rail 7. The level shift handwheel 125 in FIG. 2 is now turned, thus moving the two level shift rollers 25 and 26 on the crossbar 117 relative to the chassis 19 so that the chassis 19 is adjusted until the dumpy level 130 (or a carpenter's level may be used) on the pedestal 131 indicates that the chassis 19 is also level. If necessary, the eccentrically mounted bearings of the rollers 23-26 may also be adjusted. With the positioner 1 thus calibrated, the pressure wheel control handle 128 may be pulled back, disengaging the pressure wheel 23 from the pressure rail 12, so that the positioner 1 can be removed from the calibration stand 2.

Next the positioner 1 is moved to the site where it is to be used, in this case onto an ocean-going cargo vessel, and the positioner 1 is "leveled" again as is illustrated in FIG. 14. A crane may be used to lower the positioner 1 until its top wheels 21 and 22 rest on the track 132 which is mounted on the girder 133 on the deck 134 of the ship. Sighting through the dumpy level 130 to the level rod 139, which stands upon the track 138 on the girder 137, which is supported by the deck 136 across the cargo hold 135, the positioner 1 is again "leveled" by adjusting the level shift handwheel 125. During the construction of ocean-going vessels, it is sometimes the practice to moor the vessel in a listing attitude, and if that is the case then the positioner 1 will not be leveled with respect to gravity, but rather with respect to the attitude of the vessel, and specifically with respect to the level rod 139 on the track 138 on the opposite side of the cargo hold 135. If the vessel is level, then a carpenter's spirit level can be used to level the positioner 1 instead of using the dumpy level 130. As when the positioner 1 was mounted on the test stand 2, also on the ship the pneumatic system of the positioner 1 is connected to a source of air pressure and the pressure wheel handle 128 is pushed forward to energize the pressure wheel cylinder 116 so that the pressure wheel 23 in FIG. 8 will be urged against the pressure rail 12 forcing the guide roller 24 against the datum rail 11. The operation of the positioner 1 is best shown in the other Figures of the Drawings.

After the positioner 1 is leveled, it may be rolled along the T-rail 7 to the location of the first rack segment 16 to be mounted. A plurality of rack segments 16 are mounted end to end to make up the completed rack 3, and depending on which end of the ship the first rack segment 16 is mounted, the positioner 1 may advance either from left to right or right to left along the T-rail 7 for mounting successive rack segments 16. If the positioner 1 is moving from left to right, the cable drum 99 on the left side will be used to hoist the rack segments 16, and if from right to left, the cable drum 100 on the right is used. The special hook 112 on the end of the cable 110 operated from the cable drum 99 will engage a rack segment 16 midway between its ends. The hoist handle 127, which controls both the direction and velocity of the pneumatic motor 101b can be lifted to drive the cable drum 99 to hoist a rack segment 16. The rack segment 16 is hoisted until it is slightly above the disk platforms 88 and 89 on the ends of the rack carrying rods 84 and 85, and then the hoist motor 101b is stopped and the rack segment 16 is held while the rack carrying rods 84 and 85 are pushed forward so that the disk platforms 88 and 89 are beneath the rack segment 16. The hoist motor 101b is then actuated to lower the rack segment 16 up on to the disk platforms 88 and 89 on the rack carrying rods 84 and 85, to hold the rack segment 16, and then the hook 112 can be removed from the rack segment 16.

The pitch block and jaw assembly 35 is then placed on the rack segment 16 so that the pitch block 36 is in mesh with the teeth 47 and 48 of the rack segment 16 opposite the spindle 30 and the bell crank jaws 52 and 53 pass around the rack segment 16. The spindle control handle 129 may then be pushed forward to energize the spindle cylinder 81 which retracts its piston rod 82 driving the spindle 30 inward until it engages the pitch block and jaw assembly 35. The threaded end of the spindle shaft 34 will thus be thrust into the internally threaded hole 71 and the link 70 and the handwheel 75 on the spindle shaft 74 is then turned to draw the link 70 with its attached actuator bar 65 on to the threaded end 76 of the spindle shaft 74. The ends 68 and 69 of the actuator bar 65 thus engage the force arms 58 and 59 of the bell crank jaws 52 and 53, respectively, and draw the bell crank jaws 52 and 53 back, pivoting them about the pins 54 and 55, so that the hooked ends 62 and 63 of the bell crank jaws 52 and 53 grip the rack segment 16 and clamp it into tight meshing engagement with the pitch block 36. With the spindle 30 extended the full length of the movement of the piston rod 82 of the spindle piston 81, the rack segment 16 held by the pitch block assembly 35 will be precisely located in space so that the drive pinion (not shown) to engage it will define with the completed rack 3 a predetermined operating pitch place precisely at the desired center distance from the center of the drive pinion (not shown).

The steel clips 17 and 18 are then welded to the vertical plate 5. In the case of the first of a series of rack segments 16 to be mounted end to end, the steel clips 17 and 18 are also lightly, tack welded to the rack segment 16 adjacent to the pitch block 35. The handwheel 75 on the spindle shaft 74 is then turned to release the link 70 with its attached actuator bar 65 in the pitch block and jaw assembly 35. After this is completed, the spindle control lever 129 is pulled backward to actuate the spindle cylinder 81 to retract the spindle 30 so that the positioner 1 can be moved along the T-rail 7 to a location adjacent, in this case, the left end of the rack segment 16. The pitch block and jaw assembly 35 is then removed from its original location and replaced opposite the spindle 30, the spindle 30 advanced to engagement with the pitch block and jaw assembly 35 and the spindle shaft 74 turned into engagement with the link 70 on the actuator bar 65 to locate precisely the rack segment 16, which is then welded to the steel clips 17 and 18.

After the first rack segment 16 has been mounted as described in the preceding paragraph, another rack segment 16 is grasped midway between its ends by the hoist hook 112 and raised by operation of the hoist motor 101b. The positioner 1 is then rolled along the T-rail 7 to the location for the mounting of the second rack segment 16. The second rack segment 16 is then hoisted to a level above the rack carrying rods 84 and 85, which are advanced beneath it, and the rack segment 16 is lowered on to the disk platforms 88 and 89 on the ends of the rack carrying rods 84 and 85. Next, the rack alignment clamp 141 is mounted over the abutting ends of the two rack segments 16 with the trough 159 engaging the tooth on one side of the abutment and the pitch rod 158 inserted in the space between the two teeth on the other side of the abutment and the clamp 141 is drawn up tight. Preferably the rack segments 16 are made so that half of a tooth projects from each end, as is shown in the patent of Barr, entitled "Gear or Rack Construction", U.S. Pat. No. 3,636,791, which issued on Jan. 25, 1972, and in this case, the half teeth of the two abutting rack segments 16 are made to overlap one another and the V-shaped trough 159 engages the two overlapping half teeth. The trough 159 and the pitch rod 158 are so spaced that when the clamping jaws 152, 153 and 154 are drawn up tightly with the cam handles 155, 156 and 157, the rack segments 16 will be precisely aligned with one another and the unmounted rack segment 16 is in position to be welded to the steel clips 17 and 18. Before the welding is performed, the pitch block and jaw assembly 35 is mounted on the rack segment 16 and engaged by the spindle shaft 74 in the manner described above with the spindle 30 advanced to its proper position. Thus both ends of the rack segment 16 are precisely located and the rack segment 16 can now be welded to the steel clips 17 and 18. When the welding has been completed, the alignment clamp 141 can be removed, the pitch block and jaw assembly 35 released and removed and the operation can be repeated with another rack segment 16 until the rack 3 is completed. When the rack 3 on one side is completed, the operation is then repeated on the other side of the vessel.

From the foregoing detailed description of one, specific, preferred embodiment of the invention, the salient features of the invention may be perceived and the application of the invention in other embodiments for the mountings of different types of gears and different environments can be deduced. For the optimum results, two reference points and a level indicator are desirable for the location of the gear. In the preferred embodiment two reference points are the vertical reference as represented by the top wheels 21 and 22 riding on the head 10 of the T-rail 7 and the guide roller 24 riding along the datum rail 11. The level indicator in the preferred embodiment is the dumpy level 130. With the two reference points and the level indicator, the chassis 19 is precisely located in space, and the next task is to locate the gear member 16 with respect to the chassis 19. The prior art would locate the gear member, in this case the rack segment 16, with respect to some mounting surface, a back surface if it is a rack or a center if it is a round gear, and so on. However, it is advantageous to mount the gear member directly with respect to the critical surface, the operating pitch surface. The present invention accomplishes this by the use of the pitch block and jaw assembly 35 which mesh with the teeth of the gear member so as to locate the desired operating pitch surface. The spindle 30 is then located to place the pitch block and jaw assembly 35 in a precise, predetermined position with respect to the precisely positioned chassis 19, with the final result that the pitch surface of the gear member, in this case the rack segment 16, is precisely and accurately located in space with respect to its own, desired operating pitch surface. The alignment clamp serves the same function by insuring the proper junction of two adjacent rack segments 16. Manifestly, the pitch block and jaw assembly 35 must be adapted to the gear system for the mounting of which it is to be used and if a rack 3 is to be assembled from a series of rack segments 16 using an alignment clamp 141, this alignment clamp 141 also must be adapted to the pitch and dimensions of the specific rack.

The foregoing portion of this specification, together with the drawings, describe the invention and the manner and process of making and using it, in the requisite full, clear, concise and exact terms as to enable any person skilled in the art or science to which the invention or discovery pertains, or with which it is most nearly connected, to make and use the same, and it sets forth the best mode contemplated by the inventor of carrying out his invention. By contrast with the purpose and scope of the foregoing description, it is the claims that follow that particularly point out and distinctly claim the subject matter which the applicant regards as his invention.

I claim:

1. An apparatus for positioning a gear element for mounting, the combination comprising:
 a chassis having a vertical guide and support means to locate it in a vertical plane and to support it, a lateral guide and support means to locate it in a horizontal plane and support it laterally, a level indicator to indicate its attitude, and means for adjusting its attitude; and a gear fixture having a frame supported by said chassis and a pitch block and jaw assembly for gripping a gear element and engaging teeth of said gear element to position said gear element with respect to a predetermined operating pitch surface.

2. An apparatus for positioning a gear element as set forth in claim 1 wherein:

said lateral guide and support means includes means to engage a lateral reference and pressure means to continuously urge said means into engagement with said lateral reference when said apparatus is in use.

3. An apparatus for positioning a gear element as set forth in claim 1 wherein:

said vertical guide and support means includes wheels to roll on a track and to support said chassis; and said lateral guide and support means includes a guide roller to engage a datum rail and a pressure roller movably mounted to be urged continuously against a pressure rail so as to hold said guide roller in engagement with said datum rail.

4. An apparatus for positioning a gear as set forth in claim 1 wherein:

a powered hoist means is mounted in said chassis to hoist said gear element to said pitch block and jaw assembly.

5. An apparatus for positioning a gear element for mounting, the combination comprising:

a chassis having support and guide means for engaging external reference surfaces to support and locate said chassis in a predetermined location with respect to a desired location for mounting a gear element;

a gear fixture including a fixture frame supported by said chassis, a spindle adjustably mounted in said fixture frame and having a mounting face on one end, a pitch block and jaw assembly releasably fastened to said mounting face and having a pitch block shaped to mesh with teeth of said gear element; and movable jaws to releasably grip a body of said gear element to hold said gear element in meshing relationship with said pitch block.

6. An apparatus for positioning a gear element as set forth in claim 5 wherein:

said spindle is hollow and a spindle shaft is rotatably mounted inside said spindle with a threaded end projecting from said mounting face of said spindle; and said pitch block and jaw assembly includes an actuator bar with a link adapted to be threadedly engaged by said threaded end of said spindle shaft and to be moved thereby to actuate said movable jaws.

7. An apparatus for positioning a gear element as set forth in claim 5 wherein:

said spindle is mounted for axially reciprocating movement and means are provided for axially moving said spindle such that said spindle can be automatically axially moved to at least one precisely located position.

8. An apparatus for positioning a gear element as set forth in claim 5 wherein:

a power hoist means is supported by said chassis for hoisting said gear element to said pitch block and jaw assembly and movable gear holding means are mounted on said fixture frame to hold said gear element adjacent said pitch block and jaw assembly.

9. An apparatus for positioning a gear element as set forth in claim 8 wherein:

said support and guide means include wheels for moving said chassis to different gear element mounting locations and to carry said gear elements to said mounting locations.

* * * * *